United States Patent [19]

McAlister

[11] Patent Number: 5,118,490
[45] Date of Patent: Jun. 2, 1992

[54] ABSORPTION OF WET CONVERSION GAS

[75] Inventor: Donald R. McAlister, Ballwin, Mo.

[73] Assignee: Monsanto Company, St. Louis, Mo.

[21] Appl. No.: 369,301

[22] Filed: Jun. 21, 1989

[51] Int. Cl.$^5$ .................... C01B 17/76; C01B 17/775
[52] U.S. Cl. .................................. 423/522; 423/532; 423/533
[58] Field of Search ............... 423/522, 531, 532, 533

[56] References Cited

U.S. PATENT DOCUMENTS

| 3,350,169 | 10/1967 | Rinchkoff | 423/522 |
|---|---|---|---|
| 3,525,586 | 5/1970 | Drechsel et al. | 423/522 |
| 4,009,250 | 2/1977 | Novozhilov | 427/522 |
| 4,029,751 | 6/1977 | Dorr et al. | 423/522 |
| 4,136,153 | 1/1979 | Robertson et al. | 423/522 |
| 4,348,373 | 9/1982 | Schoubye | 423/522 |
| 4,368,183 | 1/1983 | Dorr et al. | 423/522 |
| 4,478,809 | 10/1984 | McAlister et al. | 423/522 |
| 4,576,813 | 3/1986 | McAlister et al. | 423/522 |
| 4,670,242 | 6/1987 | McAlister et al. | 423/531 |
| 4,842,835 | 6/1989 | Dorr et al. | 423/522 |

FOREIGN PATENT DOCUMENTS 471653  9/1937  United Kingdom .

OTHER PUBLICATIONS

P. Shoubye, "Sulphuric acid production from lean H2S-containing gases"; Jul./Aug. 1978; 38-42 pp. Sulphur No. 137.
Unknown; "HRS fronts Monsanto's latest push in sulphuric acid technology"; Mar./Apr. 1987, Sulphur.
D. R. McAlister et al.; "Economically Recovering Sulfuric Acid Heat"; Jul. 1986; 34-38 pp; Chemical Engineering Progress.

Primary Examiner—Michael Lewis
Assistant Examiner—Stephen G. Kalinchak
Attorney, Agent, or Firm—Senniger, Powers, Leavitt & Roedel

[57] ABSTRACT

An improved process for manufacture of sulfuric acid by catalytic oxidation of wet sulfur dioxide gas. Wet conversion gas is contacted with sulfuric acid in a heat recovery stage to effect absorption and generate the heat of absorption. Wet gas having a mole ratio of sulfur trioxide to water vapor of at least 0.95 is introduced into the heat recovery stage at a temperature above the dew point of the gas. Sulfuric acid is introduced into the heat recovery absorption stage at a temperature of at least about 170° C. and a concentration between about 98.5% and about 99.5%. The sulfuric acid stream as discharged from the absorption stage is at a temperature of at least about 190° C. and has a concentration between about 99% and about 100%. The heat of absorption is recovered from the discharge absorption acid stream in useful form by transfer of heat to another fluid in a heat exchanger, the another fluid being heated to a temperature of at least about 140° C. The exit gas stream from the heat recovery stage is contacted with sulfuric acid in a condensing stage for absorption of residual sulfur trioxide and condensation of sulfuric acid vapor. The liquid/gas contact in the condensing stage is carried out before the exit gas is either exhausted from the process or catalytically oxidized to produce additional sulfur trioxide.

29 Claims, 3 Drawing Sheets

ABSORPTION OF WET CONVERSION GAS

BACKGROUND OF THE INVENTION

This invention relates to the manufacture of sulfuric acid by a process which comprises catalytic oxidation of wet sulfur dioxide containing gases, and more particularly to an improved process in which the heat of absorption of the components of the wet conversion gas is recovered in useful form.

Manufacturing of sulfuric acid is predominantly carried out by the dry gas contact process, in which sulfur is typically burned in dry air to produce a stream containing sulfur dioxide, the resultant dry sulfur dioxide is catalytically oxidized to sulfur trioxide, and the sulfur trioxide is absorbed in sulfuric acid. Wet sulfur dioxide-containing gas from other sources, such as ore roasting or spent acid combustion, is normally dried before catalytic conversion of the sulfur dioxide to sulfur trioxide. Combustion air for the sulfur burners is dried by contact with sulfuric acid. In such processes, the heat of condensation of the water vapor in the air is wasted. Moreover, installation and operation of the drying tower requires an allocation of space, a substantial investment, and significant operating expense. Also, the operation of the drying tower complicates the overall process water balance and, under some conditions, requires cross-flow transfers of acid to control that balance.

The manufacture of sulfuric acid by processing wet sulfur dioxide and/or sulfur trioxide containing gas is also known in the prior art. The scheme is sometimes referred to as the wet catalytic process. Wet process plants typically operate on feed stocks such as hydrogen sulfide which produce water and $SO_2$ when burned. In a typical wet gas process, cooled combustion gases are taken directly to the converter, thus eliminating the extensive capital cost associated with gas purification and drying. However, such plants are not without drawbacks. A very large quantity of acid mist may be formed in the absorption step, making emission control difficult and expensive. Wet gas processes often produce sulfuric acid concentrations of less than 93%, though this can be controlled, for example, by burning a combination of sulfur and hydrogen sulfide.

British patent 471,653 describes a process for producing sulfuric acid from wet sulfur dioxide feed gas. In accordance with the process of the British patent, wet $SO_2$ gas is filtered and oxidized in a vanadium catalyzed contact unit to produce a wet $SO_3$ gas at a temperature of 400°–430° C. This gas is contacted in a first liquid/gas contact tower with concentrated sulfuric acid at 98% concentration and a temperature of about 200° C., and then in a second tower with 98% sulfuric acid at a temperature of 60°–70° C. The molecular ratio of sulfur trioxide to water is controlled in the range of 1:1, which produces an acid having a composition in the range of 98% constituting an azeotrope of minimum vapor pressure. The patent suggests that the absorption of water predominates in the first tower, while the absorption of sulfur trioxide occurs predominantly in the second tower. Thus, the reference process does not appear to facilitate recovery of absorption energy at high temperature and, indeed, there is no disclosure or suggestion in the reference that the absorption energy is recovered at all.

Schoubye U.S. pat. no. 4,348,373 describes a process for the preparation of sulfuric acid by condensation of a wet sulfur trioxide gas stream. The stream is fed to a multi-stage tower, in the middle stage of which $SO_3$ is absorbed in acid circulated from a sump below the absorber stage to a spray head above. Acid overflowing the sump passes through a lower concentrator section through which the inlet $SO_3$ laden gas is passed, and heat from the inlet gas effects the stripping of water from the acid passing through the concentrator stage, thereby increasing the $H_2SO_4$ concentration in the acid which is discharged from the bottom of the tower. Thus, the absorption energy is not recovered for any separate process use, but is instead used for stripping the sulfuric acid stream leaving the tower. Even so, the acid produced in the concentrator stage has a strength only in the range of 93–96%, and acid circulated through the absorber stage has a concentration of 85–88%.

Dorr et al. U.S. pat. no. 4,368,183 describes a wet gas process in which a reaction gas containing sulfur trioxide and water vapor, at an $H_2O/SO_3$ mole ratio below one, is first condensed by co-current contact with sulfuric acid in a venturi, the sulfuric acid having a concentration of 98.0–100% and a temperature of at least 95° C. as fed to the inlet of the venturi. Gas leaves the venturi at a temperature of at least 120° C. and is passed through a succeeding countercurrent absorption stage and contacted with trickling sulfuric acid having a concentration of 98–100% and a temperature of 70°–120° C. However, as in the case of British '653, and Schoubye '373, Dorr et al contains no disclosure of recovery of the heat of absorption in useful form.

McAlister and Ziebold U.S. pat. nos. 4,576,813 and 4,670,242 describe processes for absorbing sulfur trioxide in sulfuric acid at high temperature and recovering the absorption heat in useful form by transferring heat from the absorption acid to another fluid, thereby heating the other fluid to 120° C. or higher.

There has been a need in the art for a process which provides the capital savings of the wet gas process while controlling acid emissions and achieving maximum energy efficiency by recovery of the heat of absorption of components of wet conversion gas in sulfuric acid.

SUMMARY OF THE INVENTION

Among the several objects of the present invention, therefore, may be noted the provision of an improved wet gas process for the manufacture of sulfuric acid by catalytic oxidation of sulfur dioxide; the provision of such a process in which wet sulfur dioxide gas is produced by burning sulfur in undried air; the provision of such a process in which acid mist formation and sulfuric acid emissions are minimized; the provision of such a process which produces highly concentrated sulfuric acid; the provision of such a process in which the heat of absorption, including the heat of condensation of water contained in the wet gas, is recovered in useful form; the provision of such a process in which the heat of absorption is recovered at high temperature; the provision of such a process in which the heat of absorption may be used to generate steam at moderate pressure; and the provision of such a process in which energy recovery is realized by transfer of heat from absorption acid in a metal heat exchanger.

Briefly, therefore, the present invention is directed to an improvement in a process for the manufacture of sulfuric acid. The process comprises catalytically oxidizing a wet gas containing sulfur dioxide to produce a wet conversion gas, and contacting the wet conversion gas with sulfuric acid, thereby producing sulfuric acid by absorption of components of the wet conversion gas into the sulfuric acid stream. In accordance with the improvement, wet conversion gas is contacted with sulfuric acid in a heat recovery absorption stage to effect absorption and generate the heat of absorption. The wet conversion gas as introduced into the absorption stage is at a temperature above its dew point and has a mole ratio of sulfur trioxide to water vapor of at least about 0.95. The sulfuric acid stream is introduced into the absorption stage at a temperature of at least about 170° C. and a concentration of between about 98.5% and 100%. As discharged from the absorption stage, the sulfuric acid stream has a temperature of at least about 190° C. and a concentration of between about 99% and about 100%. The heat of absorption is recovered from the discharged absorption acid stream in useful form by transfer of heat to another fluid in a heat exchanger, the another fluid being heated to a temperature to at least about 140° C. The exit gas from the heat recovery absorption stage is contacted with sulfuric acid in a condensing stage for absorption of residual sulfur trioxide and condensation of sulfuric acid vapor. Contact between gas and acid in the condensing stage is carried out before the exit gas is either exhausted from the process or catalytically oxidized to produce additional sulfur trioxide.

BRIEF DESCRIPTION OF THE DRAWINGS

Corresponding reference characters indicate corresponding process equipment elements in the several views of the drawings.

DESCRIPTION OF THE PREFERRED EMBODIMENTS

In accordance with the invention, it has been absorption of the components of a wet contact conversion gas may be recovered in a process in which sulfuric acid is produced from a wet $SO_2/SO_3$ feed stream. High efficiency energy recovery is achieved by contacting the wet conversion gas stream with sulfuric acid in a heat recovery absorption stage and passing the absorption acid through a heat exchanger where the absorption heat is transferred to another fluid. This energy is recovery stage at high temperature and heating the other fluid to a temperature in excess of 140° C.

The process of the invention may be utilized for production of sulfuric acid from wet $SO_2$ generated from a variety of sources, including roasting of metal ores and $H_2S$ combustion. However a particularly important and preferred application of the process of the invention is production of sulfuric acid from $SO_2$ gas produced by burning sulfur in air which has not been dried.

By controlling the temperature of the wet conversion gas feed stream to the heat recovery stage, and the temperature of the sulfuric acid entering and leaving the heat recovery absorption stage, formation of acid mist is minimized and sulfuric acid emissions thereby controlled. Careful control of the sulfuric acid composition also permits the energy of absorption and condensation to be recovered at high temperature by transfer of heat to another fluid in a heat exchanger containing heat transfer means constructed of a relatively economical and available iron/chromium, iron/nickel/chromium, or nickel/chromium alloy. Control of the composition of the acid in the heat recovery stage allows the absorption to be carried out in a heat recovery tower constructed of a similar alloy.

In order to control the composition of the absorption acid stream and allow recirculation thereof, and to minimize corrosion of metallic components of the absorption apparatus and absorption acid heat exchanger, it is essential that the molar ratio of $SO_3$ to water in the wet conversion gas be about 0.95 or greater. This allows the absorption acid strength to be controlled in the range of between about 99% and about 100%, compositions which are well suited to alloys described in U.S. pat. nos. 4,576,813 and 4,670,242 as materials of construction for the heat exchanger used to transfer heat from the heat recovery absorption acid to a heat transfer fluid.

Figure 1:
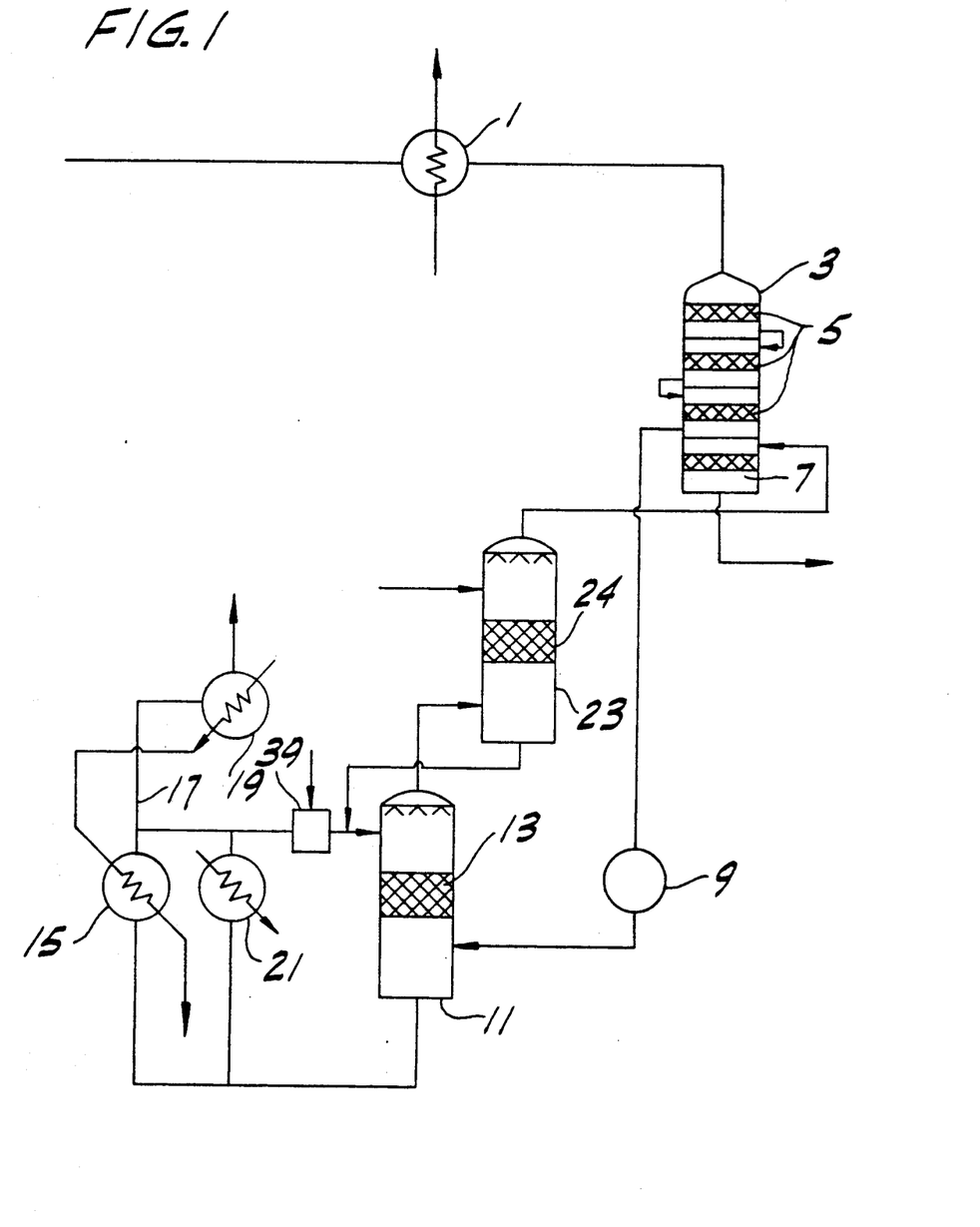
FIG. 1 is a process flow diagram of a sulfuric acid plant which is operated in accordance with the improved process of the invention.

FIG. 1 illustrates a process flow diagram implementing the process of the invention. Since the sulfuric acid process is generally well known, the various conventional features of a sulfuric acid plant are not depicted in detail. As shown in FIG. 1, wet sulfur dioxide laden gas, as produced, for example, by burning sulfur in wet air, is cooled in a first heat exchanger 1 before entering a catalytic converter 3. In the illustrated process, first heat exchanger 1 is used to generate steam.

Converter 3 typically has a plurality of catalyst beds which are divided into a first oxidation stage 5 and a second oxidation stage 7. Heat exchanger 9 is used to cool the wet gas stream exiting stage 7. Typically the tubes of exchanger 9 are maintained at a temperature above the dew point of the gas. This avoids catastrophic corrosion of the tubes by condensed sulfuric acid.

The wet gas stream exiting heat exchanger 9 is fed to a heat recovery tower 11 where it is contacted countercurrently with a hot sulfuric acid stream. The inlet gas to the heat recovery stage contains some concentration of sulfur trioxide, water vapor, and sulfuric acid vapor. Contact of the gas with liquid sulfuric acid causes absorption of sulfur trioxide, condensation and absorption of water vapor, and condensation and absorption of sulfuric acid vapor in the liquid sulfuric acid stream. It will be understood that, in the context of this disclosure, the terms "heat of absorption" and "energy of absorption" include all of these various heat effects. Such may also include at least some of the energy that is generated in the formation of sulfuric acid from sulfur trioxide and water in the vapor phase.

By introducing the gas stream to the heat recovery stage at a temperature as high as practicable above its dew point, using hot acid, and controlling the relative flow rates so that the acid exit temperature is no cooler than about 40° C. below the dew point of the inlet gas, and preferably no cooler than about 20° C. below the dew point of the inlet gas, formation of acid mist in the heat recovery absorption stage is minimized. Typically, the dew point of the incoming $SO_3$ gas is in the range of between about 230° and about 270° C. Thus, the acid should be discharged from the heat recovery stage at a temperature of at least 190° C., generally between about 190° and about 250° C. Preferably, the exit acid temperature should be in the range of between about 210° and about 250° C., the optimum depending on the dew point of the $SO_3$ gas. The temperature of the incoming gas is typically in the range of about 300° to about 470° C., preferably between about 350° and about 470° C., and in any case is preferably at least about 50° C. above its dew point. As shown in the drawing, the gas flows upward through the absorption stage (sometimes referred to hereinafter as the "heat recovery zone or "heat recovery stage"), which contains means such as a bed of packing 13 for promoting contact and mass transfer between the gas and liquid phases. While this description is of a countercurrent packed tower, it is contemplated that other gas/liquid contacting devices such as tray towers or co-current venturi absorbers can be used. Sulfuric acid is delivered to the top of the absorption zone 13 at a temperature preferably between 170° and about 220° C., and a concentration between about 98.5% and about 99.5%. Generally, the preferred inlet acid concentration is dependent on the water content of the incoming gas so that when the $SO_3$ to water mole ratio approaches about 1.0 the strength of the acid entering the tower is preferably in the range of 99% to 99.5% and this concentration remains essentially constant throughout the absorption zone and circulating system. Although the absorption stage is operated at elevated temperatures, at least about 90% of the equivalent sulfur trioxide in the inlet gas stream is absorbed in the heat recovery stage. "Equivalent sulfur trioxide" is defined herein as the molar sum of the sulfur trioxide and sulfuric acid vapor content of the inlet gas stream.

After leaving the absorption stage, the hot concentrated sulfuric acid passes through a heat exchanger 15 where the energy of absorption is removed by transfer of heat to another fluid. Preferably, the cooling fluid is water and the heat of absorption is recovered—at least in part—by the generation of low to medium pressure steam, for example, steam having an absolute pressure between approximately 150 and 2,000 kPa and normally between approximately 300 and 1,200 kPa. In a particularly preferred mode of operation, the acid leaving the heat recovery absorption zone is maintained at a temperature greater than 200° C., and steam is generated in heat exchanger 15 at a pressure of 450 kPa absolute or greater. Steam generated in heat exchanger 15 by transfer of the absorption heat may be used in a variety of applications.

Whatever cooling fluid is used, the temperature of the cooling fluid should be raised to at least 140° C. by transfer of heat from the absorption acid in exchanger 15. Preferably the cooling fluid is heated to a temperature of at least about 160° C.

After passing through exchanger 15, the acid stream or at least a portion thereof is recirculated to the heat recovery tower at a point above absorption stage 13. To maintain a constant volume of acid in the circuit, another portion of the acid exiting exchanger 15 is removed from the circuit as overflow acid through line 17. Additional heat may be recovered from the overflow acid by passing it through a second heat exchanger 19. In this exchanger heat transferred from the overflow acid is used to preheat boiler feed water before the feed water is delivered to exchanger 15 or another steam generator.

Instead of generating steam, exchanger 15 may be operated to further heat feed water for a high pressure boiler. Or optionally, the acid leaving heat recovery tower 11 may be divided into two streams, one passed through exchanger 15 for generation of low to moderate pressure steam, the other passed through another heat exchanger 21 for heating high pressure boiler feed water. Exchangers 15 and 21 may be operated on parallel sulfuric acid streams, as shown, or in some circumstances it may be advantageous for the sulfuric acid from tower 11 to pass through exchangers 15 and 21 in series. In series operation the acid would normally be used first for heating high pressure boiler feed water, but either sequence could be used. In a conventional sulfur burning plant, high pressure boiler feed water is typically preheated in an economizer by transfer of heat from sulfur trioxide containing gas leaving heat exchanger 9. In the wet gas process of the invention, since a relatively high $SO_3$ gas temperature helps inhibit mist formation, it is preferable to eliminate the economizer. However, this does not mean that the heat otherwise recovered in the economizer is sacrificed, or that generation of high pressure steam is necessarily reduced. Any penalty in these respects is substantially avoided by operating one of exchangers 15 and 21 to produce low to moderate pressure steam, e.g., at less than 12 bar, and the other of the exchangers to steam at greater than 12 bar, typically 40–70 bar.

Heat exchangers 15 and 21 comprise means for indirect transfer of heat between two fluids, ordinarily a solid partition such as, for example, the tube wall of a shell and tube heat exchanger or the plates of a plate type exchanger. It will be understood that the scheme under which one of exchangers 15 and 21 is used for high pressure feed water and the other for moderate pressure steam generation is applicable to dry gas sulfuric acid plants as well as wet gas plants. A particular advantage is provided by this scheme in a wet gas plant since it prevents the decrease in high pressure steam generation that might otherwise be suffered because there is preferably no economizer in the gas stream ahead of the heat recovery zone. In a dry gas plant, other advantages can still accrue from using a portion of the heat recovery absorption acid for heating high pressure boiler feed water. Capital savings can accrue from use of a liquid/liquid heat exchanger rather than a gas/liquid heat exchanger for heating high pressure boiler feed water.

Depending on the composition of the gas entering the heat recovery tower, it may be necessary for the circulating acid to be diluted at some point. Required water may be added within the heat recovery tower 11 or in the piping between the heat recovery tower and exchanger 15. However, it is preferred that any dilution water be added in mixing stage 39 following the cooling of the sulfuric acid in exchanger 15 (and exchanger 21), and before the sulfuric acid re-enters the heat recovery tower. Dilution water may also be added as a vapor. Alternatively, the dilution water can be added as dilute sulfuric acid.

Energy recovery from the absorption stage is maximized when the diluent is water. Dilution with weaker acid increases the flow of hot acid through exchanger 19, making it difficult to recover the heat efficiently, especially where there is a limited flow of boiler water to be heated.

To minimize corrosion in exchangers 15 and 21, the strength of the acid is maintained at least 98.5%, preferably at least 99% in its passage through the exchangers.

As a result of the high temperature operation of the heat recovery stage, the gas stream exiting the top of this stage is relatively hot and is in contact with hot acid. This in turn results in stripping sulfuric acid from the acid stream into the gas stream. Although the absorption efficiency of the heat recovery stage is preferably at least about 90%, high temperature operation of the heat recovery stage also results in some unabsorbed SO₃ passing through that stage. Gas exiting the top of the heat recovery stage is, therefore, directed to a condensing stage 23 for absorption of residual sulfur trioxide and condensation of sulfuric acid vapor. The condensing stage also contains means 24 for promoting gas/liquid contact and mass transfer and heat transfer therebetween. Preferably this stage comprises a countercurrent packed tower. Relatively cool acid having a concentration of at least 98% is fed to the top of the tower and gas leaving the heat recovery stage at a temperature of about 170° to 230° C. is delivered to the bottom of the tower.

As a result of cooling the gas and condensing sulfuric acid vapor, the dew point of the gas stream is reduced, which helps prevent condensation in and corrosion of downstream ducts and equipment. The temperature differential between the liquid and gas streams is maintained relatively small throughout the condensing stage, so as to minimize formation of acid mist upon condensation of sulfuric acid in this step. On passage through condensing stage 23, the gas stream is typically cooled to a temperature in the range of between about 75° and about 140° C., normally between about 80° and about 120° C., preferably between about 75° and 100° C. At the gas exit from the condensing stage, it is preferred that the acid temperature be below about 120° C., generally 60°-120° C., preferably between about 60° C. and about 100° C., most preferably between about 60° and about 80° C.

The acid flow rate in the condensing stage is maintained at a rate low enough so that the acid leaves this stage at a temperature which approaches the temperature of the acid entering the heat recovery stage. Thus, the weight basis flow rate of the absorption stage acid is at least about four times, preferably between about four and about twenty times, that of the condensing stage acid stream. The flow rate of acid to the condensing stage is selected in this range to give a relatively small gas to liquid temperature differential throughout the condensing stage, thus inhibiting mist formation therein. The magnitude of the temperature differential depends on the mass and heat transfer area in the condensing stage, which in turn is a function of the packing height where packing is used as the means for promoting gas/liquid contact. Most commonly the packing may consist of 1½"-2" saddles. Generally a packed height of about 5 to about 15 feet is preferred, a height of about 6 to 10 feet being most convenient for many applications. Given a sufficient amount of packing, the acid temperature at the bottom of the condensing stage approaches the temperature of the acid entering the heat recovery stage, so that these two acid streams may be advantageously blended, producing a stream having a concentration of 98.5 to 99.5% that is passed through the heat recovery stage, exiting the heat recovery stage at a concentration of 99%-100% and a temperature of 190°-250° C. In this arrangement, the energy of absorption and condensation from both stages may be recovered at high temperature in heat exchanger 15 positioned in the acid recirculating stream for the heat recovery absorber.

The remainder of the sulfuric acid process is in general well known. The sulfur trioxide depleted gas stream leaving the condensing stage is reheated and returned to second oxidation stage 7 of converter 3 to complete oxidation of the remaining sulfur dioxide. This final passage through an oxidation stage completes the conversion of sulfur dioxide to sulfur trioxide. The gas stream exits from the converter and is cooled before passing through a final absorption tower in which the sulfur trioxide in the gas stream is absorbed into sulfuric acid.

A number of equipment and construction options are available for the condensing stage. Thus, as depicted in FIG. 1, this stage may be provided in a tower or vessel separate from the heat recovery stage. This may conveniently be the case where the heat recovery system is installed by retrofitting an existing plant, the existing interpass tower serving as a condensing facility. Alternatively, the condensing stage may be provided as a separate packed section or zone in the same housing that contains the heat recovery stage. As a further alternative, a single packed section may comprise a lower zone for high temperature heat recovery absorption, and an upper zone for lower temperature condensation. In such an arrangement, acid is fed to the top of the packed section at a relatively low temperature and low flow rate. This acid is heated in the condensation stage to a temperature which approaches the temperature of the acid entering the heat recovery stage, usually in the range of between about 150° and about 220° C., then mixed at the top of the heat recovery stage with a relatively large flow of acid at 170° C. to 220° C., as discussed above. The mixed stream is passed countercurrently to the incoming wet conversion gas stream in the lower stage.

By the process herein described, the heat of absorption is recovered from the sulfuric acid process in useful form; that is in a form that may be utilized to produce a benefit either through use in a process or through the generation of electricity. Moreover, the process of the invention provides a distinct advantage over a dry gas process where water vapor contained in combustion gases or combustion air is removed in a drying tower and the energy of condensation is entirely lost. The present invention is particularly advantageous in wet acid plants in which the feed to the plant is obtained by burning sulfur with undried ambient air to provide a wet sulfur dioxide-containing gas stream.

Elimination of the drying tower provides substantial savings in capital investment, operating cost and space utilization, and avoids the cross-flow of large volumes of acid that may otherwise be necessary to control the concentration of acid in the drying tower circuit during periods of high humidity. In a dry gas plant, the drying acid is diluted by the water in the incoming gas stream, and the drying acid must be cross-flowed or blended with stronger acid to maintain the strength of the drying acid. When the gas humidity is relatively low, cross flow or blending of the drying acid with acid from the final absorption system is effective in controlling acid strength. As the gas humidity increases, cross flow to the heat recovery system becomes necessary, and this substantially increases the volume of overflow acid from the heat recovery system. As indicated above, the increased volume of overflow acid may strain the capacity of the overflow acid cooling system, so that the overflow acid leaves the cooling system at relatively high temperature, resulting in substantial loss of energy. As described hereinbelow, the overflow acid from the heat recovery system is typically transferred to the final absorption system where energy is dissipated to cooling water at temperatures too low for useful energy recovery. By eliminating the drying tower, and diluting the heat recovery absorption system circulating acid with water, crossflows are avoided, thereby maximizing the recovery of $SO_3$ absorption energy.

As noted above, the process illustrated in FIG. 1 is operated so that a heat transfer fluid is heated in exchanger 15 to a temperature of at least 140° C. Advantageously, heat exchanger 15 is a boiler in which boiler feed water is converted to steam. Preferably, the temperature of the sulfuric acid is maintained above 170° C. throughout its passage through the heat exchanger. The process of the invention is capable of heating the heat transfer fluid to higher temperatures, as high as 200° C. or more.

It has been determined that mist formation in the heat recovery stage is minimized when the gas enters the heat recovery absorption stage at a temperature as far above its dew point as practicable, and the acid exiting the absorption stage (flowing countercurrently to the incoming gas) is at a temperature as close to the gas dew point as is feasible. This provides relatively slow cooling of the gas, thereby minimizing the tendency for condensation to occur in the bulk gaseous phase rather than at the interface of gas and liquid. Although the relative gas and liquid temperatures at the gas inlet/acid exit are a primary concern, it is also desirable to maintain a relatively moderate liquid temperature gradient throughout the heat recovery absorption zone. Liquid temperature gradient along the absorption zone decreases as the ratio of liquid to gas mass flow rates increases. Generally, the L/G ratio for the heat recovery absorption stage should be in the range of 5 to 20 kg/kg, most preferably in the range of about 8 to about 12.

Figure 2:
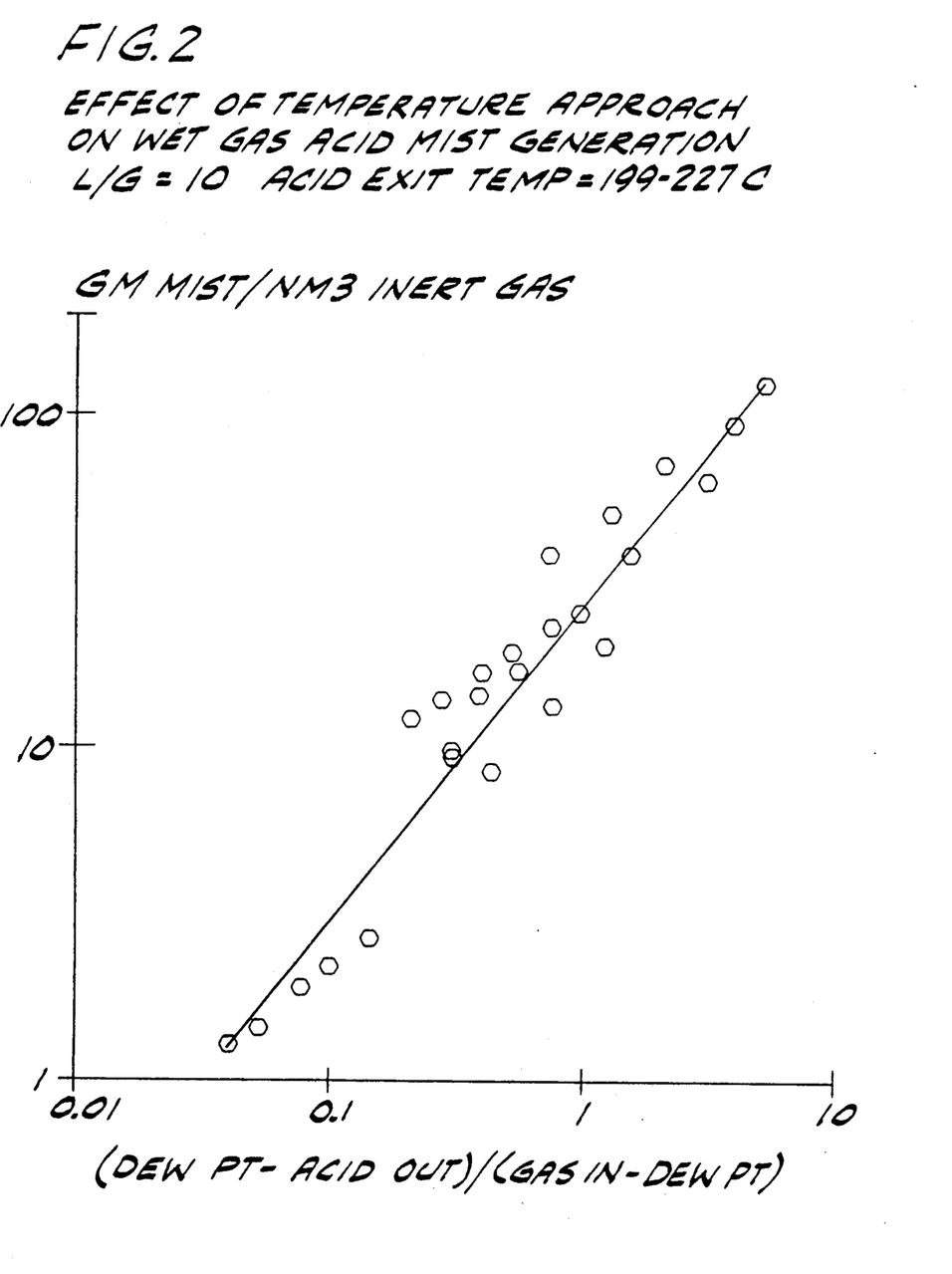
FIG. 2 is a plot of calculated data indicating the effect on acid mist formation of gas inlet temperature, acid exit temperature and gas inlet dew point in a countercurrent wet gas absorption stage.

FIG. 2 is a plot of data generated by a mathematical model of the effect on mist formation of the gas inlet and acid exit temperatures of the heat recovery stage relative to the dew point of the incoming gas. As indicated, the data is plotted for a constant L/G of 10 and for acid exit temperatures ranging from 199°-227° C. Preferably, the x-axis parameter, (inlet gas dew point-exit acid temp.)/(inlet gas temp.-inlet gas dew point) is not greater than about 0.5, corresponding to an average mist loading of not more than about 15 g/Nm$^3$. Although operation of the heat recovery stage with high inlet gas temperatures and moderate liquid temperature gradient throughout the heat recovery stage minimizes the formation of mist in that stage, it will be understood that the $H_2SO_4$ vapor content of the gas increases with the inlet temperature of acid to the heat recovery stage. This vapor is recovered in a condensing stage as described above. However, at the optimum conditions for mist suppression in the heat recovery stage, the vapor content of the gas exiting that stage is relatively high and may increase mist generation in the condensing stage. Accordingly, the overall optimum conditions for mist suppression in the gas leaving the condensing stage are achieved when the acid entering the heat recovery stage is not hotter than about 220° C.

Figure 3:
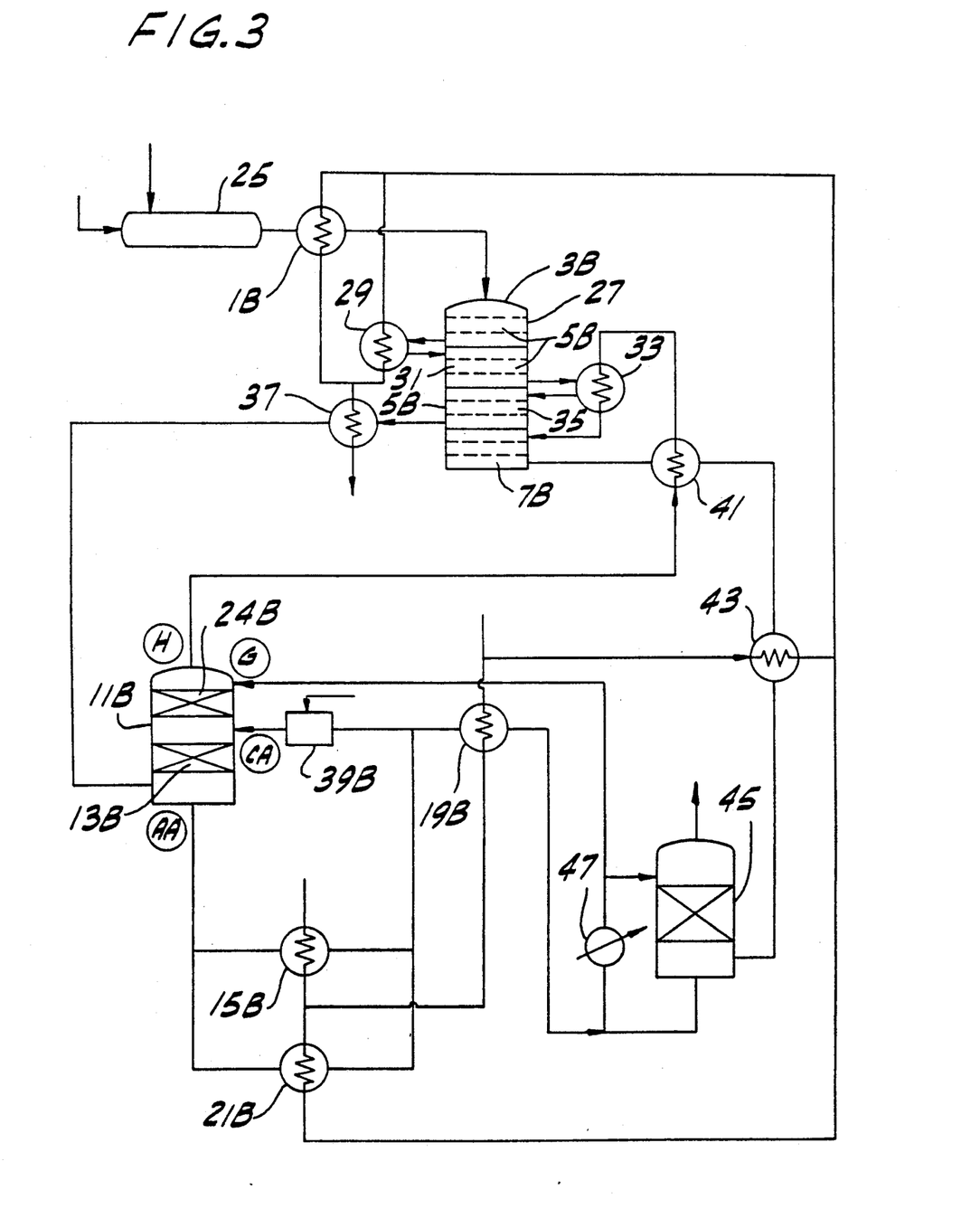
FIG. 3 is a process flow diagram illustrating a further particularly advantageous scheme for implementing the process of the invention.

An especially preferred embodiment of the process of the invention is illustrated in FIG. 3. Sulfur is burned with undried ambient air in sulfur burner 25. The wet combustion gas is passed through a high pressure steam boiler 1B and then to the first oxidation stage 5B of a catalytic converter 3B. Gas exiting the first catalyst bed 27 of oxidation stage 5B is passed through a waste heat boiler 29 and back through a second catalyst bed 31. Conversion gas exiting bed 31 is passed through a hot gas heat exchanger 33 where it is cooled by exchange of heat with gas returning from the heat recovery system as described further below. Conversion gas exiting exchanger 33 is delivered to the third catalyst bed 35 of first oxidation stage 5, thence through a superheater 37 in which steam generated in boiler 1B is raised above its saturation temperature. From superheater 37, the hot conversion gas, still preferably at a temperature well above its dew point, is directed to the heat recovery system. It will be understood by those skilled in the art that a different arrangement of boilers and superheaters would be used if it were desired to produce high pressure steam with a high degree of superheat.

Gas from the superheater enters heat recovery tower 11B below heat recovery stage 13B and is contacted in stage 13B with a sulfuric acid stream obtained by combining acid streams charged to the tower at points CA and G. Temperatures and concentrations of the acid entering and exiting stage 13B are as described above. Gas exiting the top of stage 13B enters condensing stage 24B where it is contacted with sulfuric acid charged at point G for condensation of sulfuric acid vapor, absorption of residual sulfur trioxide. The acid fed to the condensing stage at point G is taken from a final absorption tower acid circuit as described hereinbelow. The flow rate of acid in condensing stage 24B is preferably relatively low, so that the temperature of the acid exiting the bottom of the condensing stage approaches the temperature of the acid fed to the heat recovery stage at point CA. Preferred temperatures for the acid entering stage 24B, concentrations of the acid entering and leaving stage 24B, and temperatures of the gas leaving stage 24B are as described above with respect to stage 24 in FIG. 1.

Acid exiting stage 13B at 190° to 250° C. is divided into two portions; one portion thereof is circulated through heat exchanger 15B, and the other portion is circulated through heat exchanger 21B. Heat exchanger 15B is a low to moderate pressure boiler in which steam is generated at a pressure in the range of 300 to 2000 kPa. In heat exchanger 21B, absorption heat from the acid is transferred to boiler feed water that flows to boiler 1B for the generation of high pressure steam, typically 40 to 70 bar. The acid streams leaving exchangers 15B and 21B are recombined and returned to heat recovery tower 11B at point CA above heat recovery stage 13B. Before the acid enters the tower, any necessary makeup water is added in mixing stage 39B. A sidestream of overflow acid is removed from the combined acid stream and transferred to the acid circulating system of a final absorption tower whose operation is described below. Before entering the final absorption acid circuit, the overflow acid from the heat recovery tower is passed through a heat exchanger 19B where heat is transferred to the boiler feed water which subsequently passes through boiler 15B and feed water heater 21B.

In the instance where one of exchangers 15B and 21B is used for heating boiler feed water for a high pressure steam boiler and the other is used for generation of moderate pressure steam, two separate heat exchangers are preferably provided in the place of heat exchanger 19B, one such exchanger for each of the feed water streams, in order to minimize the power required to pump boiler feed water.

Gas exiting tower 11B from the condensing stage 24B is reheated in a cold gas heat exchanger 41 and returned to second oxidation stage 7B of converter 3B. After further conversion of $SO_2$ contained in the gas to $SO_3$, the gas is cooled in cold gas exchanger 41 by exchange of heat with the gas returning from tower 11B. The S)3-containing gas is then passed through an economizer 43, in which it is further cooled by transfer of heat to boiler feed water, and thereafter directed to a final absorption tower 45 where the SO3 is absorbed in 98+% sulfuric acid. As noted above, acid produced in the heat recovery system flows through boiler feed water preheater 19B to the acid circuit of final absorption tower 45. Acid circulated through final absorption tower 45 is maintained at conventional absorption temperatures by removal of heat in a heat exchanger 47. Ultimate product is usually removed from this circuit downstream of exchanger 47. A portion of this product is recycled to tower 11B at point G for use in the condensing stage of the heat recovery operation. Alternatively, acid from the heat recovery stage acid circuit can be directed to the condensing stage, but this would require the use of an additional cooler to bring this acid to the desired temperature.

It has been determined that certain materials are particularly suitable for construction of the heat recovery tower 11 and the heat exchangers 15 or 15B, 19 and 19B and 21 or 21B, as well as pumps and various other items of process equipment associated with the heat recovery tower. Certain particular alloys have been found preferable for their corrosion resistance at the conditions under which the heat recovery tower, heat exchanger and pump are operated. Provided that the acid concentration is maintained within the ranges specified hereinabove, it has been determined that the rates of corrosion are surprisingly low for a substantial range of iron/chromium, nickel/chromium, and iron/chromium/nickel alloys, even at highly elevated temperatures substantially above 170° C. As indicated above, the alloys used for heat exchanger tubes, and other equipment elements exposed to the hot concentrated heat recovery tower absorber acid, should be constituted of either a ferrous alloy containing chromium, an iron-nickel alloy containing chromium, or a nickel alloy containing chromium. In each instance, the alloy should have an austenitic, ferritic, or ferritic/austenitic duplex structure.

Alloys suited for service in this heat recovery system should have compositions which give a corrosion index (CI) greater than or equal to about 7 as defined by the following equation:

$$CI = 0.4[Cr] - 0.05[Ni] - 0.1[Mo] - 0.1[Ni] \times [Mo]$$

where:
[Cr] = the weight percent of chromium in the alloy,
[Ni] = the weight percent of nickel in the alloy, and
[Mo] = the weight percent of molybdenum in the alloy.
Preferably the above defined CI is greater than 8. As indicated by the algorithm, it is preferable to avoid alloys which have both a high Ni and a high Mo content. However, alloys which contain high Ni and very low Mo, or low Ni and moderate proportions of Mo are acceptable.

For alloys of the above described type, industrially acceptable corrosion rates are a matter economics. Generally, such alloys should suffer a corrosion rate of not greater than 0.15 millimeters per year, preferably not greater than 0.10 mm per year, in 99% acid at 170° C. However, in addition to varying with general economic factors bearing on the profitability of a particular plant, the acceptable rate of corrosion varies with the function of the equipment for which an alloy is considered as a candidate. For heat exchanger tubes, an acceptable rate is generally in the range of 0.05 to 0.08 mm/yr, though a somewhat higher rate may be justified depending on the cost of energy. Also, for piping, pump tanks, distributors, or the shell of an absorption tower, slightly to moderately higher rates of corrosion may be tolerated. Based on corrosion data obtained in connection with the development of the process of the invention, it has been found that stainless steel type alloys are generally preferred to nickel alloys for use in equipment exposed to the heat recovery tower absorber acid at temperatures above 170° C.

A preferred material of construction is 304L stainless steel (U.S. patent Ser. No. S30403). Other preferred materials include 309S stainless steel (U.S. patent Ser. No. S30908), 310S stainless steel (U.S. patent Ser. No. S31008), the alloy sold under the trade designation E-Brite by Allegheny Ludlum Steel (U.S. patent Ser. No. S44627), the alloy sold under the trade designation 29-4-2 by Allegheny Ludlum Steel (U.S. patent Ser. No. S44800), the alloy sold under the trade designation Ferralium 255 by Haynes International (U.S. patent Ser. No. S32550), and the alloy sold under the trade designation SAF 2304 by Sandvik (U.S. patent Ser. No. S32304). As generally exemplified by Alloy 29-4-2, Alloy 26-1, Alloy 255, 304L stainless steel, 309S stainless steel, SAF 2304, and 310S stainless steel, a preferred range of alloys comprises between about 18% and about 30% by weight chromium, up to about 22% by weight nickel, up to about 4% by weight molybdenum, and the balance essentially iron. Other conventional alloying elements may be present in minor proportions.

While the alloys of the above-described type are preferred materials of construction, in some instances conventional materials of construction for the heat recovery tower may be more cost effective. In such cases, the heat recovery tower can be constructed of carbon steel and lined with a ceramic material to protect the carbon steel shell from the corrosive attack of the sulfuric acid. Such construction is very similar to that typically utilized for a conventional absorption tower. In the case of heat exchanger 15 or 21, either the entire exchanger or only the means for transfer of heat from the acid to the heat transfer fluid, for example, the tubes, tube sheet, and channels of a shell and tube exchanger, are fabricated of the corrosion resistant alloy. In the latter case, the acid is passed through the tubes of the exchanger and the shell is constructed of a relatively low cost material such as mild steel for containment of a relatively non-corrosive cooling fluid.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limited sense.

What is claimed is:
1. In a process for the manufacture of sulfuric acid which comprises catalytically oxidizing a wet feed gas containing sulfur dioxide to produce a wet conversion gas, said wet feed gas having been produced by oxidation of a source of sulfur with a source of oxygen comprising undried air, and contacting the wet conversion gas with sulfuric acid, thereby producing sulfuric acid by absorption of components of the wet conversion gas into the sulfuric acid stream, the improvement which comprises:

contacting a wet conversion gas with sulfuric acid in a heat recovery absorption stage to effect absorption and generate the heat of absorption, said sulfuric acid being introduced into said heat recovery stage at a temperature of at least about 170° C. and a concentration of between about 98.5% and about 99.5%, the sulfuric acid stream as discharged from said heat recovery stage being at a temperature of at least about 190° C. and having a concentration of between about 99% and about 100%, the temperature of the gas entering the heat recovery stage being at least about 50° C. above its dew point, said dew point being not more than about 40° C. above the temperature of the acid as discharged from said heat recovery stage;

recovering the heat of absorption from said discharge absorption acid stream in useful form by transfer of heat to another fluid in a heat exchanger, thereby heating said another fluid to a temperature of at least about 140° C.; and contacting the exit gas from said heat recovery absorption stage with sulfuric acid in a condensing stage for absorption of residual sulfur trioxide and condensation of sulfuric acid vapor, said contact in said condensing stage being carried out before said exit gas is either exhausted from the process of catalytically oxidized to produce additional sulfur trioxide.

2. An improved process as set forth in claim 1 wherein said gas is passed countercurrently to sulfuric acid in both said heat recovery absorption stage and said condensing stage.

3. An improved process as set forth in claim 2 wherein the temperature of the sulfur trioxide-containing gas entering said heat recovery stage is between about 300° and about 470° C.

4. A process as set forth in claim 2 wherein sulfuric acid enters said heat recovery absorption stage at a temperature of between about 170° and about 220° C. and a concentration of between about 98.5% and about 99.5% and is discharged from said heat recovery stage at a temperature of between about 190° and about 250° C. and a concentration of between about 99% and about 100%.

5. An improved process as set forth in claim 2 wherein the acid stream delivered to said condensing stage has a concentration between about 98% and about 100% and a temperature between about 65° C. and about 120° C., and the acid discharged from the condensing stage has a temperature approaching the temperature of the sulfuric acid stream delivered to the heat recovery absorption zone.

6. An improved process as set forth in claim 5 wherein each of said heat recovery absorption stage and said condensing stage comprises a packed section within a heat recovery tower, said condensing stage being positioned above said heat recovery absorption stage within said tower.

7. An improved process as set forth in claim 1 wherein the sulfur trioxide containing gas is produced in the first oxidation stage of a catalytic converter having a plurality of stages, and said gas is cooled to a temperature of between about 300° and about 470° C. by passage through a steam superheater.

8. An improved process as set forth in claim 1 wherein said another fluid as introduced into said heat exchanger comprises a liquid, and transfer of heat to said another fluid results in vaporization of said another fluid so that said another fluid comprises a vapor as it exits said exchanger.

9. An improved process as set forth in claim 1 wherein said discharge acid stream is divided, one portion thereof being passed through a boiler for generation of steam at less than 12 bar, and another portion being passed through a second heat exchanger in which boiler feed water is preheated for use in generating steam at greater than 12 bar.

10. An improved process as set forth in claim 1 wherein said heat exchanger comprises means for transfer of heat from said sulfuric acid to said another fluid, the nature of the material of said heat transfer means being such that it has a corrosion rate of not greater than about 0.10 mm per year in 99% sulfuric acid at 170° C.

11. An improved process as set forth in claim 1 wherein the material of construction of said heat transfer means comprises an iron/chromium, nickel/chromium, or iron/chromium/nickel alloy having a composition which has a corrosion index, CI, ≧7 corresponding to the algorithm:

$$CI = 0.4[Cr] - 0.05[Ni] - 0.1[Mo] - 0.1[Ni] \times [Mo]$$

where:
[Cr] = the % by weight of chromium in the alloy
[Ni] = the % by weight of nickel in the alloy
[Mo] = the % by weight of molybdenum in the alloy.

12. An improved process as set forth in claim 11 wherein said material of construction is selected from the group consisting of 304 stainless steel, 309S stainless steel, 310S stainless steel, 26-1 stainless steel, SAF 2304, and 29-4-2 stainless steel.

13. An improved process as set forth in claim 11 wherein said another fluid comprises water, and steam is generated in said heat exchanger.

14. An improved process as set forth in claim 1 wherein said wet gas containing sulfur dioxide is produced by burning sulfur in air which has not been dried.

15. An improved process as set forth in claim 11 wherein said wet gas containing sulfur dioxide is produced by burning sulfur in ambient air.

16. An improved process as set forth in claim 14 wherein said gas and sulfuric acid are passed countercurrently through both said heat recovery absorption stage and said condensing stage.

17. An improved process as set forth in claim 16 wherein the dew point of the sulfur trioxide-containing gas entering said heat recovery stage exceeds the temperature of the discharge sulfuric acid stream at the exit of said heat recovery stage by not more than about 40° C.

18. An improved process as set forth in claim 16 wherein the temperature of the sulfur trioxide-containing gas entering said heat recovery stage exceeds the dew point of said gas by at least about 50° C.

19. An improved process as set forth in claim 16 wherein the temperature of the sulfur trioxide-containing gas entering said heat recovery stage is between about 300° and about 470° C.

20. A process as set forth in claim 16 wherein sulfuric acid enters said heat recovery absorption stage at a temperature of between about 170° and about 220° C. and a concentration of between about 98.5% and about 99.5% and is discharged from said heat recovery stage at a temperature of between about 190° and about 250° C. and concentration of between about 99% and about 100%.

21. An improved process as set forth in claim 16 wherein the acid stream delivered to said condensing stage has a concentration between about 98% and about 100% and a temperature between about 65° C. and about 120° C., and the acid discharged from the condensing stage has a temperature approaching the temperature of the sulfuric acid stream delivered to the heat recovery absorption zone.

22. An improved process as set forth in claim 21 wherein each of said heat recovery absorption stage and said condensing stage comprises a packed section within a heat recovery tower, said condensing stage being positioned above said heat recovery absorption stage within said tower.

23. An improved process as set forth in claim 14 wherein said another fluid as introduced into said heat exchanger comprises a liquid, and transfer of heat to said another fluid results in vaporization of said another fluid so that said another fluid comprises a vapor as it exits said exchanger.

24. An improved process as set forth in claim 14 wherein said discharge acid stream is divided, one portion thereof being passed through a boiler for generation of steam at less than 12 bar, and another portion being passed through a second heat exchanger in which boiler feed water is preheated for use in generating steam at greater than 12 bar.

25. An improved process as set forth in claim 14 wherein said heat exchanger comprises means for transfer of heat from said sulfuric acid to said another fluid, the nature of the material of said heat transfer means being such that it has a corrosion rate of not greater than about 0.10 mm per year in 99% sulfuric acid at 170° C.

26. An improved process as set forth in claim 14 wherein the material of construction of said heat transfer means comprises an iron/chromium, nickel/chromium, or iron/chromium/nickel alloy having a composition which has a corrosion index, CI, $\geq 7$ corresponding to the algorithm:

$$CI = 0.4[Cr] - 0.05[Ni] - 0.1[Mo] - 0.1[Ni] \times [Mo]$$

where:
[Cr] = the % by weight of chromium in the alloy
[Ni] = the % by weight of nickel in the alloy
[Mo] = the % by weight of molybdenum in the alloy.

27. An improved process as set forth in claim 26 wherein said material of construction is selected from the group consisting of 304 stainless steel, 309S stainless steel, 310S stainless steel, SAF 2304, 26-1 stainless steel, and 29-4-2 stainless steel.

28. An improved process as set forth in claim 26 wherein said another fluid comprises water, and steam is generated in said heat exchanger.

29. An improved process as set forth in claim 1 wherein the sulfur trioxide containing gas is produced in the first oxidation stage of a catalytic converter having a plurality of stages, and said gas is cooled to a temperature of between about 300° and about 470° C. by passage through a steam superheater.

* * * * *